(12) United States Patent
Saarelma

(10) Patent No.: US 6,434,272 B1
(45) Date of Patent: Aug. 13, 2002

(54) SYSTEM AND METHOD FOR IMAGE PROCESSING

(75) Inventor: Hannu Saarelma, Helsinki (FI)

(73) Assignee: Teknillinen Korkeakoulu, Viestintarekniiken Laboratorio, Espoo (FI)

( * ) Notice: Subject to any disclaimer, the term of this patent is extended or adjusted under 35 U.S.C. 154(b) by 0 days.

(21) Appl. No.: 09/319,631

(22) PCT Filed: Dec. 18, 1997

(86) PCT No.: PCT/FI97/00809

§ 371 (c)(1),
(2), (4) Date: Jun. 8, 1999

(87) PCT Pub. No.: WO98/30974

PCT Pub. Date: Jul. 16, 1998

(30) Foreign Application Priority Data

Dec. 18, 1996 (FI) .................................................... 965106

(51) Int. Cl.⁷ ................................................. G06K 9/62
(52) U.S. Cl. ...................................... 382/224; 382/225
(58) Field of Search ............................... 382/224, 225, 382/254, 305, 306, 317, 180; 399/178, 197, 377; 358/426, 467

(56) References Cited

U.S. PATENT DOCUMENTS

| | | | | |
|---|---|---|---|---|
| 5,604,578 A | * | 2/1997 | Shibuya et al. | 399/178 |
| 5,818,439 A | * | 10/1998 | Nagasaka et al. | 345/327 |
| 5,881,168 A | * | 3/1999 | Takaoka | 382/180 |

* cited by examiner

*Primary Examiner*—Andrew W. Johns
*Assistant Examiner*—Seyed Azarian
(74) *Attorney, Agent, or Firm*—Andrus, Sceales, Starke & Sawall

(57) ABSTRACT

The invention relates to a system and a procedure for image processing. The system comprises a data communication network (1) which serves as a channel for the transmission of the image being processed, digitized in an electronic form of representation, and an image processing device (2; 2a, 2b, 2c), which is connected to the data communication network (1) and which processes the image to enhance its visual quality to print the image to different formats. According to the invention, the image processing system comprises a classifying device (3), which automatically classifies the image, and a correcting device (4), which automatically corrects the image.

8 Claims, 1 Drawing Sheet

SYSTEM AND METHOD FOR IMAGE PROCESSING

CROSS-REFERENCE TO RELATED APPLICATION

The present application is the U.S. national stage application of International Application PCT/FI97/00809, which international application was published on Jul. 16, 1998 as International Publication WO 98/30974 A1 in the English language.

BACKGROUND OF THE INVENTION

The present invention relates to an image processing system as defined in the preamble of claim 1 and to an image processing procedure as defined in the preamble of claim 5 for the processing of images via a data communication network.

Conventional colour printing is partly an artistic activity. It takes a professional image processing specialist and complicated operations to produce guaranteed image quality. Offset printers are artists in their own field; the inking must be controlled specifically for each image. Digital colour printers have changed the situation. People without any deep knowledge of printing can manipulate, process and print different types of colour images. The digital printing mode enables decentralisation of the various processing operations comprised in printing. Decentralised printing involves new aspects in the production of paper-based reading material. The various stages of production are more individual. An image can be printed with different printers using different printing parameters.

Colour control in printing is traditionally based on colour correction. Colour correction means compensating for the distortion in printing that arises from non-ideal absorption of the spectral coverage of colour in the printing toner. At present, colour correction is based on data obtained via test printing, i.e. there is no reliable computational method available.

In digital image processing, in decentralised printing and in digital colour printers, general colour correction is needed. The term 'hardware independent colour' simply means that the values of digitised colour code and a system of chromaticity coordinates for the printer are defined by convention. These relationships have been modified by balancing the visual system of chromaticity coordinates, such as CIELab and CIELuv. As regards hardware independence, the system of chromaticity coordinates can also be defined in terms of RGB or CMYK. The idea of hardware independence has been extended to decentralised printing systems in a data communication network environment, by defining profiles separately for each input device and each output device. When different devices are connected to the system, the same hardware levels and uniform control methods are used. The profiles are colour correction descriptors for different correction operations, which have to be defined experimentally. This means that the profiles for all possible inputs and outputs must be known. This naturally restricts the concept of decentralised printing as an independent system regarding place and time.

The old idea about the printing of a colour image is that the oraginal image is a model for the printing. This is a misleading idea because the true colours of the original image are not necessarily known. The image may have been digitised with a cheap camera or the image has been generated by an older coding method, which may result in inadequate image quality. If the image is to be printed, it has to be enhanced and corrected.

SUMMARY OF THE INVENTION

The object of the present invention is to eliminate the drawbacks mentioned above.

The image processing system comprises four different types of device; an input device, an image enhancing device, a display terminal and an output device. All devices are independently connected to a data communication network. Each device knows its own parameters, e.g. the colour correction profile. Each device has artificial intelligence to enable the device to process the data of a source independent image. What was said above means that it is not necessary to know the technical origin of the image. The image can be encoded by any coding method generally used. When the image is processed by a device comprised in the image processing system in question, a signal section can be added to the image code. The signal section may contain e.g. illumination information about the object of the image and make-up information about image processing.

When the system of the invention is compared with conventional colour printing, one new requirement regarding changed working principles emerges. Today, those who use colour printing are editors, writers and computer users in general, whereas ten years ago they were professional image operators. Interactive image make-up operations are optional, but not indispensable for an acceptable printing result.

As for the features characteristic of the invention, reference is made to the claims.

The image processing system of the invention comprises a data communication network, which serves as a channel for the transmission of the image being processed, digitised in an electronic form of representation, and which connects an image processing device comprised in the system. The image processing device processes the image and prints it to different formats. According to the invention, the image processing device comprises an image enhancing device. The image enhancing device automatically classifies and corrects the image. The image enhancing device may also only classify or only correct the image.

In the procedure of the invention, an image digitised in an electronic form of representation is transmitted in a data communication network, in which the image is processed by means of different devices. The processing is aimed at improving the visual quality of the image. Besides improving the visual quality of the image, the image is printed to different formats; in other words, the image can be printed e.g. to a display terminal or on paper. According to the invention, the image is automatically classified on the basis of a signal section comprised in the image code, and, based on the classification, corrections are made in the image.

The image processing system is decentralised so that the system input, a separate image processing device, a display terminal and the system output can be disposed in different locations and the functions of different devices can be performed at different times. Each device in the system only needs the image code. No technical parameters of the other devices are needed. Such a system can be said to be source and device independent.

In an embodiment of the device, the image processing system comprises a profile generating device, in which the image is processed on the basis of device-specific properties.

In an embodiment of the device, the image processing system comprises an adding device arranged to add information code to the image, which information code may contain e.g. information about the illumination conditions of the image, image correction operations and image quality in general.

In an embodiment of the device, the image is in digital format in the image processing system. The digital image format may have been encoded by many different methods commonly used.

According to an embodiment of the procedure, in the automatic image correction, edge areas in the image are first identified. Next, gamma correction of the image is carried out. After this, the grey shade balance, brightness and RGB contrast of the image are adjusted. Finally, the sharpness of the image is enhanced, image noise is filtered and the colour memory is adjusted.

In an embodiment of the procedure, the image is processed in the output device in accordance with the profile, i.e. characteristic features of the output device.

In an embodiment of the procedure, the automatic image correction function uses information obtained from a standard observer. The observer is shown different images, of which he/she selects a preferred image, based on certain criteria.

In an embodiment of the procedure, output device-specific correction is carried out after automatic classification and correction.

BRIEF DESCRIPTION OF THE SEVERAL VIEWS OF THE DRAWING

In the following, the invention will be described in detail by the aid of embodiment examples by referring to the attached drawing, in which.

DETAILED DESCRIPTION OF THE INVENTION

Figure 1:
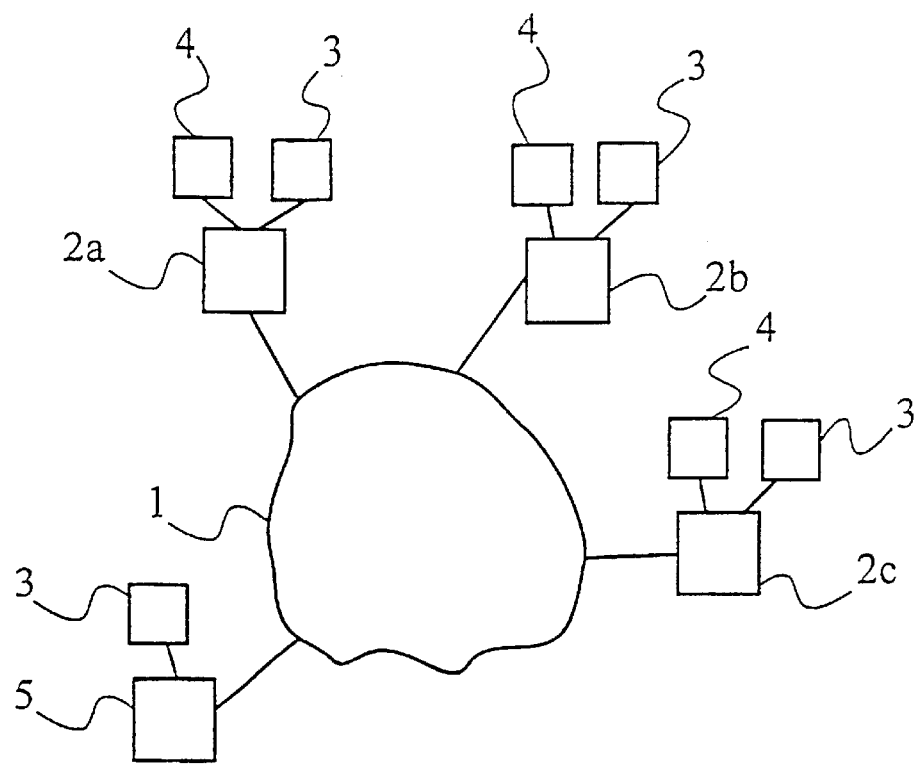
FIG. 1 represents an embodiment of the image processing system of the invention.

FIG. 1 presents an image processing system according to present invention, in which three different image processing devices 2 are connected to a data communication network 1. Image processing device 2a is a device that receives the image from the data communication network 1, corrects the image as necessary and sends the image back into the system. Image processing device 2a comprises a classifying device 3 which classifies the image according to its properties. Object classification has been developed because the objects in different images require different colour rendering and some colours are so-called memory colours. A prototype for this classification is the identification of a person's complexion and the adjustment of the complexion to a preselected colour. Skin identification is performed using automatic sectioning in which image areas are selected based on a classification of the chromaticity coordinates for the human skin. In the classification, visual chromaticity coordinates are used and the skin colours have been measured from a large number of images taught to the system. Device 2a also comprises a correcting device 4 for automatic correction of the image. This automatic image correction improves the quality of all types of image. The correction is based on a computer that has been taught to recognise human preferences regarding visual colour rendering. The image parameters to be corrected are grey shade balance, presentation of local and overall shades, sharpness and noise. Target values for grey shade balance and image sharpness are relatively easy to find. When colour is involved, the situation becomes more complicated. By investigating, an agreement between different people regarding the best manner of representation of colour images has been achieved. Based on this agreement, the properties of a digitised image can be inferred with a certain accuracy from the colours measured from a picture. Automatic colour correction has been taught to a computer by showing several thousand test pictures to a hundred test persons. Automatic classification and correction can be incorporated in a standard word processing, page editor or image processing programme. This supports a working mode in which the author of a document fetches images from a data communication network or inputs them from an electronic camera or picture recorder independently. Image processing device 2b presents the image on a display terminal. Image processing device 2b also comprises a classifying device 3 and a correcting device 4. Image processing device 2c prints the image on paper. The image processing device also comprises a classifying device 3 and a correcting device 4. An input device 6 feeds the image, digitised in an electronic form of representation, into the system. The input device 6 comprises a classifying device 3, which classifies the image. The system may also receive pictures from other sources in addition to the input device 6 because the data communication network 1 is not necessarily a small limited network.

Figure 2:
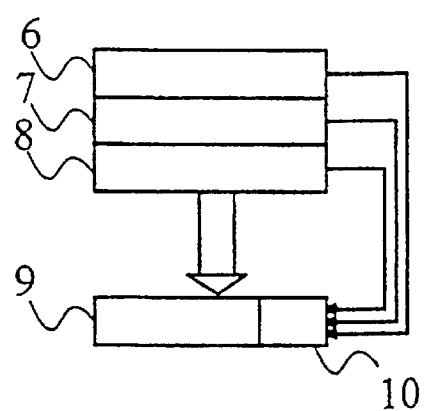
FIG. 2 presents a block diagram representing the operation of a classifying device 3 comprised in the system of the invention.

In the first block 6 in the functional block diagram in FIG. 2, the quality of the image fed in is measured using certain given parameters. At the same time, information about the image quality is added to the signal section comprised in the image code. In the next stage, block 7, the details of the image are identified and make-up instructions for local colours are registered in the signal section. After this, block 8, the main motif of the image is identified and instructions for colour make-up is added to the signal section of the image. Blocks 9 and 10 represent the final image, which comprises the image code itself, block 9, and the signal section of the image, block 10.

Figure 3:
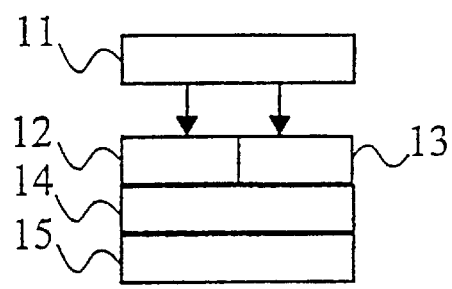
FIG. 3 presents a block diagram representing the operation of an image processing device 2b comprised in the system of the invention.

In FIG. 3, the image code is examined, block 11, according to the functional block diagram to establish whether it comprises a signal section. If a signal section is found, then image correction is performed based on the signal section, block 12, and if no signal section is found, then correction is performed automatically without additional information, i.e. operation proceeds to block 13, where the correction is carried out. After this alternative operation, the image code is passed on to device-specific treatment, in this case display terminal-specific treatment, block 14. Finally, the image code is displayed as a visual image on the display terminal, block 15.

The image processing consists of image classification and automatic correction. In the course of time, a classification algorithm has been developed for automatic determination of image quality, dynamic range, MTF (modulation transfer function) and noise. The algorithm determines by a computational method whether the image quality is sufficient or insufficient for further processing. The quality classification algorithm is based on the assumption that the digitised image contains gradual distortions and uniform areas. The MTF is calculated from the distortion and noise of a uniform area. A good correlation between these values and the sharpness and noise of the visual image can be achieved.

In the system, each display terminal and printer knows its own correction profile. In the case of a printer, the correction profile, in addition to being dependent on the printer itself, also depends on the toner and paper used in the printer.

The invention is not restricted to the examples of its embodiments described above, but many variations are possible within the scope of the inventive idea defined by the claims.

What is claimed is:

1. An image processing system, comprising:

a data communication network (1) over which an image being processed is transmitted, the image being represented by image data digitized in an electronic form of representation; an image correcting device (2a) connected to the data communication network (1), the image correcting device being configured to process the image to enhance the image visual quality and/or print the image to different formats;

wherein the image correcting device includes a classifying device for automatic classification of the image, the classifying device (3) including an adding device arranged to add information data to the image data, the information data added by the classifying device classifies the subject matter of the image and provides specific processing instructions in the form of metadata;

wherein the image correcting device further includes a correcting device (4) for automatic correction of the image, the image correcting device arranged to add information data to the image data, wherein the information data added by the correcting device improves the quality of the image by providing specific processing instructions in the information data; and a plurality of image processing devices (2a, 2b, 2c) connected to the data communication network (1), each image processing device including a profile generating device arranged to extract processing instructions from the metadata, the profile generating device being configured to process the image according to the processing instructions.

2. The image processing system of claim 1, wherein the information data added to the image data includes information about image correction, exposure conditions, motif of the image or time when the picture was taken.

3. The image processing system of claim 1 wherein the image is in a digital form in the image processing system.

4. A procedure for image processing comprising the steps of:

transmitting an image digitized in an electronic form along a data communication network;

processing the image in an image correcting device connected to the data communication network to enhance its visual quality;

printing the image in different formats;

automatically classifying the image in the image correcting device based upon the subject matter of the image; and automatically correcting the image in the image correcting device to improve the quality of the image;

wherein information data is added to the image data by the image correcting device, the information data being related to the classifying and correcting of the image data and comprising device specific processing instructions in the form of metadata; and wherein the image is processed in an output device connected to the data communication network according to the processing instructions extracted from the information data, wherein the processing instructions are specific for the output device.

5. The procedure of claim 4 wherein the information data contains information about image correction, exposure conditions, motif of the image and time when the picture was taken.

6. The procedure of claim 4 wherein the automatic correction of the image comprises the steps of:

identifying edge areas in the image;

performing gamma correction of the image;

adjusting the grey shade balance of the image;

adjusting the brightness of the image;

adjusting the RGB contrast of the image;

enhancing the sharpness of the image;

filtering out the noise of the image; and performing color memory adjustment of the image.

7. The procedure of claim 6 wherein in the automatic correction step, information obtained from a test observer is used.

8. The procedure of claim 6 wherein the output device-specific correction is performed after the automatic classification and correction.

* * * * *

UNITED STATES PATENT AND TRADEMARK OFFICE
CERTIFICATE OF CORRECTION

PATENT NO.     : 6,434,272 B1                                       Page 1 of 1
DATED          : August 13, 2002
INVENTOR(S)    : Aarelma It is certified that error appears in the above-identified patent and that said Letters Patent is hereby corrected as shown below:

Title page,
Item [56], References Cited, U.S. PATENT DOCUMENTS, insert:
-- 5,017,774   5/1991      Agano et al.
5,142,589      8/1992      Lougheed et al.
5,467,412      11/1995     Capitant et al.
5,357,352      10/1994     Eschbach
5,119,207      6/1992      Niitsuma et al. --
Item [56], insert:
--             FOREIGN PATENT DOCUMENTS
96/25879       8/1996      WIPO
44 19 395      12/1995     Germany
701,362        3/13/1996   EPO
096,219        12/1983     EPO
               OTHER PUBLICATIONS
Patent Abstract of Japan, Vol. 18, No. 600, (P-1826), Nov. 15, 1994, JP-A-6222514 --

Signed and Sealed this

Eleventh Day of March, 2003

JAMES E. ROGAN
*Director of the United States Patent and Trademark Office*